United States Patent
Azoulay

(10) Patent No.: US 10,089,343 B2
(45) Date of Patent: Oct. 2, 2018

(54) AUTOMATED ANALYSIS OF DATA REPORTS TO DETERMINE DATA STRUCTURE AND TO PERFORM AUTOMATED DATA PROCESSING

(71) Applicant: SAP SE, Walldorf (DE)

(72) Inventor: Patrick Azoulay, Paris (FR)

(73) Assignee: SAP SE, Walldorf (DE)

( * ) Notice: Subject to any disclaimer, the term of this patent is extended or adjusted under 35 U.S.C. 154(b) by 324 days.

(21) Appl. No.: 14/944,840

(22) Filed: Nov. 18, 2015

(65) Prior Publication Data

US 2017/0139966 A1    May 18, 2017

(51) Int. Cl.
G06F 17/30 (2006.01)
G06F 17/22 (2006.01)
G06F 17/24 (2006.01)

(52) U.S. Cl.
CPC .... *G06F 17/30327* (2013.01); *G06F 17/2241* (2013.01); *G06F 17/245* (2013.01); *G06F 17/30371* (2013.01); *G06F 17/30513* (2013.01)

(58) Field of Classification Search
None
See application file for complete search history.

(56) References Cited

U.S. PATENT DOCUMENTS 5,412,804 A * 5/1995 Krishna ............ G06F 17/30466
6,134,706 A * 10/2000 Carey ....................... G06F 8/20
707/999.009
6,499,064 B1 * 12/2002 Carlson ................. G06F 9/4488
719/316
7,293,175 B2 * 11/2007 Brown ..................... G06F 21/62
713/166
7,904,571 B1 * 3/2011 Kalmanek, Jr. ..... H04L 41/0823
709/229
2003/0041077 A1 * 2/2003 Davis .................. G06F 17/2247
715/205
2009/0040179 A1 * 2/2009 Lee ........................ G06F 3/0482
345/158

(Continued)

OTHER PUBLICATIONS

Extended European Search Report from EP Application No. 16002445.1, dated Aug. 9, 2017, 11 pages.

(Continued)

*Primary Examiner* — Wilson Lee
(74) *Attorney, Agent, or Firm* — Brake Hughes Bellermann LLP

(57) ABSTRACT

A computer-implemented method for building a hierarchy of elements depending on data disclosed in reports includes identifying one or more areas containing one or more elements in each of multiple reports which contain data, where the elements comprise parent elements and child elements. The method includes parsing the data of each of the elements to simulate relationship operations between the parent elements and the child elements until consistent aggregations are found, identifying data with a same unit and adjusting the data to have a same scale or a same precision, recursively searching the aggregated data by applying the found relationship operations to build a tree structure having at least a portion of the elements of each report built in the tree structure arranged in a hierarchy of elements and storing the tree structure, including a level of each of the elements and the relationship operation.

20 Claims, 12 Drawing Sheets

(56) References Cited

U.S. PATENT DOCUMENTS

| | | | | |
|---|---|---|---|---|
| 2009/0055477 A1* | 2/2009 | Flesher | ............ | G06F 17/30165 |
| | | | | 709/204 |
| 2009/0077097 A1* | 3/2009 | Lacapra | ............ | G06F 17/30079 |
| 2011/0047169 A1* | 2/2011 | Leighton | ........... | G06F 17/30675 |
| | | | | 707/756 |
| 2013/0173578 A1* | 7/2013 | Epstein | ................. | G06Q 30/00 |
| | | | | 707/706 |
| 2014/0378863 A1* | 12/2014 | Schafer | ............. | A61B 10/0012 |
| | | | | 600/551 |

OTHER PUBLICATIONS

Partial European Search Report from EP Application No. 16002445. 1, dated May 9, 2017, 13 pages.
Astrakhantsev, "Extracting Objects and Their Attributes from Tables in Text Documents", Proceedings of the Spring Young Researcher's Colloquium on Database and Information Systems SYRCoDIS, Jan. 1, 2011, 4 pages.
Long, "An Agent Based Approach to Table Recongnition and Interpretation", Dissertation from Macquarie University, Department of Computing, May 23, 2010, 286 pages.
Shigarov, "Rule-Based Table Analysis and Interpretation", Communications in Computer and Information Science, vol. 538, Jan. 1, 2015, pp. 175-186.
Hans Rosling, "The best stats you've ever seen", retrieved from http://www.ted.com/talks/hans_rosling_shows_the_best_stats_you_ve_ever_seen, Filmed on Feb. 2006, 8 pages.
Tim Berners-Lee, "The year open data went worldwide" retrieved from http://www.ted.com/talks/tim_berners_lee_the_year_open_data_went_worldwide, Filmed Feb. 2010, 9 pages.

* cited by examiner

|  | | 30-Sep-14 | 31-Dec-13 |
|---|---|---|---|
| Cash and cash equivalents | | 111457 | 225559 |
| Accounts receivables | | 948553 | 794791 |
| Inventory | | 544552 | 426195 |
| Other current assets | | 31638 | 37651 |
| Total current assets | | 1636200 | 1484196 |
| Property, plant and equipment | | 407290 | 418046 |
| Goodwill | | 25161 | 23421 |
| Intangible assets-net | | 12581 | 10510 |
| Prepaid pension benefits | | 5032 | 13584 |
| Other non-current assets | | 7548 | 21326 |
| Total assets | | 2093812 | 1971083 |
| Short-term borrowings | | 25999 | 20967 |
| Current portion of long-term debt | | 47170 | 49648 |
| Accounts payable | | 768742 | 621186 |
| Accrued payroll and benefit costs | | 100381 | 92142 |
| Other accrued taxes | | 19782 | 21168 |
| Dividends payable | | 0 | 14673 |
| Other current liabilities | | 53034 | 79409 |
| Total current liabilities | | 1015108 | 899193 |
| Postretirement benefits liability | | 89676 | 91312 |
| Pension liability | | 106906 | 106953 |
| Long-term debt | | 82531 | 111440 |
| Other non-current liabilities | | 15906 | 21395 |
| Total liabilities | | 1310127 | 1230293 |
| Outstanding common stock | | 296213 | 296652 |
| Advanced payments on subscriptions to common stock | | 886 | 0 |
| Treasury shares | | 4623 | 4875 |
| Retained earnings | | 615635 | 583526 |
| Accumulated other comprehensive loss | | -131296 | -141228 |
| Total my company, inc. shareholders' equity | | 776815 | 734075 |
| Non-controlling interests | | 6870 | 6715 |
| Total shareholder's equity | | 783685 | 740790 |
| Total liabilities and shareholders' equity | | 2093812 | 1971083 |

FIG. 2

| 300 | 30-Sep-14 | 31-Dec-13 | Control 9/30/2014 | Control 9/30/2014 |
|---|---|---|---|---|
| Cash and cash equivalents | 111457 | 225559 | | |
| Accounts receivables | 948553 | 794791 | | |
| Inventory | 544552 | 426195 | | |
| Other current assets | 31638 | 37651 | | |
| Total current assets | 1636200 | 1484196 | Ok | Ok |
| Property, plant and equipment | 407290 | 418046 | | |
| Goodwill | 25161 | 23421 | | |
| Intangible assets-net | 12581 | 10510 | | |
| Prepaid pension benefits | 5032 | 13584 | | |
| Other non-current assets | 7548 | 21326 | | |
| Total assets | 2093812 | 1971083 | Ok | Ok |
| Short-term borrowings | 25999 | 20967 | | |
| Current portion of long-term debt | 47170 | 49648 | | |
| Accounts payable | 768742 | 621186 | | |
| Accrued payroll and benefit costs | 100381 | 92142 | 304 | |
| Other accrued taxes | 19782 | 21168 | | |
| Dividends payable | 0 | 14673 | | |
| Other current liabilities | 53034 | 79409 | | |
| Total current liabilities | 1015108 | 899193 | Ok | Ok |
| Postretirement benefits liability | 89676 | 91312 | | |
| Pension liability | 106906 | 106953 | | |
| Long-term debt | 82531 | 111440 | | |
| Other non-current liabilities | 15906 | 21395 | | |
| Total liabilities | 1310127 | 1230293 | Ok | Ok |
| Outstanding common stock | 296213 | 296652 | | |
| Advanced payments on subscriptions to common stock | 886 | 0 | 306 | |
| Treasury shares | 4623 | 4875 | | |
| Retained earnings | 615635 | 583526 | | |
| Accumulated other comprehensive loss | -131296 | -141228 | | |
| Total my company, inc. shareholder's equity | 776815 | 734075 | Ok | Ok |
| Non-controlling interests | 6870 | 6715 | | |
| Total shareholders' equity | 783685 | 740790 | Ok | Ok |
| Total liabilities and shareholders' equity | 2093812 | 1971083 | Ok | Ok |

|  | Q1 | Q2 | Q3 | Q4 | 2014 |
|---|---|---|---|---|---|
| France | 3068 | 2761 | 3375 | 4142 | 13346 |
| Product A | 156 | 140 | 172 | 210 | 678 |
| Product B | 2345 | 2111 | 2580 | 3167 | 10203 |
| Product C | 567 | 510 | 624 | 765 | 2466 |
| Germany | 1221 | 1099 | 1343 | 1649 | 5312 |
| Product A | 432 | 389 | 475 | 584 | 1880 |
| Product C | 789 | 710 | 868 | 1065 | 3432 |
| UK | 1548 | 1393 | 1703 | 2090 | 6734 |
| Product A | 439 | 395 | 483 | 593 | 1910 |
| Product B | 320 | 288 | 352 | 432 | 1392 |
| Product C | 789 | 710 | 868 | 1065 | 3432 |
| Italy | 794 | 715 | 873 | 1073 | 3455 |
| Product B | 564 | 508 | 620 | 762 | 2454 |
| Product C | 230 | 207 | 253 | 311 | 1001 |
| USA | 10561 | 9505 | 11617 | 14258 | 45941 |
| Product A | 4567 | 4110 | 5024 | 6165 | 19866 |
| Product B | 2316 | 2084 | 2548 | 3126 | 10074 |
| Product C | 3678 | 3310 | 4046 | 4965 | 15999 |

FIG. 4

| | | 2014 | | | | Control Q1 | Control Q2 | Control Q3 | Control Q4 | Control 2014 |
|---|---|---|---|---|---|---|---|---|---|---|
| | | Q1 | Q2 | Q3 | Q4 | | | | | |
| France | | 3068 | 2761 | 3375 | 4142 | 13346 | OK | OK | -1 | OK | -1 |
| | Product A | 156 | 140 | 172 | 210 | 678 | | | | | |
| | Product B | 2345 | 2111 | 2580 | 3167 | 10203 | | | | | |
| | Product C | 567 | 510 | 624 | 765 | 2466 | | | | | |
| Germany | | 1221 | 1099 | 1343 | 1649 | 5312 | OK | OK | OK | OK | OK |
| | Product A | 432 | 389 | 475 | 584 | 1880 | | | | | |
| | Product B | 789 | 710 | 868 | 1065 | 3432 | | | | | |
| UK | | 1548 | 1393 | 1703 | 2090 | 6734 | OK | OK | OK | OK | OK |
| | Product A | 439 | 395 | 483 | 593 | 1910 | | | | | |
| | Product B | 320 | 288 | 352 | 432 | 1392 | | | | | |
| | Product C | 789 | 710 | 868 | 1065 | 3432 | | | | | |
| Italy | | 794 | 715 | 873 | 1073 | 3455 | OK | OK | OK | OK | OK |
| | Product A | 564 | 508 | 620 | 762 | 2054 | | | | | |
| | Product B | 230 | 207 | 253 | 311 | 1001 | | | | | |
| USA | | 10561 | 9505 | 11617 | 14258 | 45941 | OK | 1 | -1 | 2 | 2 |
| | Product A | 4567 | 4110 | 5024 | 6165 | 19866 | | | | | |
| | Product B | 2316 | 2084 | 2548 | 3126 | 10074 | | | | | |
| | Product C | 3678 | 3310 | 4046 | 4965 | 15999 | | | | | |

Control France — OK
Control product A — OK
Control product B — OK
Control product C — OK
Control Germany — OK
Control product A — OK
Control product C — OK
Control UK — OK
Control product A — OK
Control product B — OK
Control product C — OK
Control Italy — OK
Control product B — OK
Control product C — OK
Control USA — OK
Control product A — OK
Control product B — OK
Control product C — OK

| 602 Statements of Income | 3 months ended 30-Sep-14 | 3 months ended 31-Dec-13 | 9 months ended 30-Sep-14 | 9 months ended 31-Dec-13 |
|---|---|---|---|---|
| Gross Sales | 1,725.7 | 1,553.9 | 4,672.0 | 4,565.4 |
| Cash Discounts | -6.1 | -6.6 | -17.7 | -18.5 |
| Net Sales | 1,719.7 | 1,547.3 | 4,654.3 | 4,546.9 |
| Cost of merchandise sold | -1,397.6 | -1,250.3 | -3,775.8 | -3,664.6 |
| Gross margin | 322.1 | 297.1 | 878.5 | 882.3 |
| Selling general and administrative expenses | -261.3 | -259.8 | -756.6 | -785.3 |
| Depreciation and amortization | -13.8 | -13.2 | -40.9 | -40.1 |
| Other income, net | 0.8 | 0.8 | 3.8 | 3.1 |
| Income from operations | 47.8 | 24.9 | 84.9 | 60.0 |
| Interest expense, net | -2.6 | -3.2 | -8.7 | -10.9 |
| Income before provision for income taxes | 45.2 | 21.7 | 76.1 | 49.0 |
| Provision for income taxes | 17.7 | -7.7 | -30.6 | -20.3 |
| Net income | 27.4 | 13.9 | 45.5 | 28.7 |
| Less: Net income attributable to non-controlling interest | -0.1 | -0.1 | -0.2 | -0.1 |
| Net income attributable to my company, inc. | 27.3 | 13.8 | 45.3 | 28.7 |
| Net income per share of common stock | 2.58 | 1.30 | 4.27 | 2.69 |
| Cash dividends per share of common stock | 0.41 | 0.41 | 0.83 | 0.83 |
| Average common shares outstanding | 14,555 | 14,628 | 14,592 | 14,682 |

| 604 Statements of comprehensive income | 3 months ended 30-Sep-14 | 3 months ended 31-Dec-13 | 9 months ended 30-Sep-14 | 9 months ended 31-Dec-13 |
|---|---|---|---|---|
| Net income | 27.4 | 13.9 | 45.5 | 28.7 |
| Other comprehensive (loss) inome: | | | | |
| Foreign currency translation adjustment | -21.9 | 11.1 | -36.4 | -23.0 |
| Recognition pension and other postretirement benefit plans prior service credit, net | -0.1 | -0.1 | -0.2 | 0.2 |
| Net unrealized (loss) OTTI on marketable securities | 0.0 | -0.2 | -0.1 | 0.0 |
| Net unrealized (loss) gain on marketable securities | -0.9 | 0.9 | | -1.3 |
| Cash flow hedge | | | | 1.0 |
| Total other comprehensive (loss) income | -23.0 | 11.7 | -36.7 | -23.1 |
| Comprehensive income | 4.5 | 25.6 | 8.8 | 5.6 |

| Value | Account | Period |
|---|---|---|
| 1,725.7 | Gross Sales | 06/01/14-09/30/14 |
| 1,553.9 | Gross Sales | 05/01/13-09/30/13 |
| 4,672.0 | Gross Sales | 01/01/14-09/30/14 |
| 4,565.4 | Gross Sales | 06/01/13-09/30/13 |
| -6.1 | Cash Discounts | 06/01/14-09/30/14 |
| -6.6 | Cash Discounts | 06/01/13-09/30/13 |
| -17.7 | Cash Discounts | 01/01/14-09/30/14 |
| -18.5 | Cash Discounts | 01/0113-09/30/13 |
| 1,719.7 | Net Sales | 06/01/14-09/30/14 |
| 1,547.3 | Net Sales | 01/0113-09/30/13 |
| 4,654.3 | Net Sales | 06/01/14-09/30/14 |
| 4,546.9 | Net Sales | 01/0113-09/30/13 |
| | ... | |
| 27.4 | Net Income | 06/01/14-09/30/14 |
| 13.9 | Net Income | 01/0113-09/30/13 |
| 45.5 | Net Income | 06/01/14-09/30/14 |
| 28.7 | Net Income | 01/0113-09/30/13 |
| | ... | |
| 4.5 | Comprehensive Income | 06/01/14-09/30/14 |
| 25.6 | Comprehensive Income | 01/0113-09/30/13 |
| 8.8 | Comprehensive Income | 06/01/14-09/30/14 |
| 5.6 | Comprehensive Income | 01/0113-09/30/13 |

```
Identifying one or more areas containing one or more elements in
each of multiple reports which contain data, wherein the elements
comprise parent elements and child elements
902
                              │
                              ▼
Parsing the data of each of the elements to simulate the
relationship operations between the parent elements and the child
elements until consistent aggregations are found
904
                              │
                              ▼
Identifying the data with a same unit and adjusting the data to
have a same scale or a same precision
906
                              │
                              ▼
Recursively searching the aggregated data by applying the found
relationship operations to build a tree structure having at least a
portion of the elements of each report built in the tree structure
arranged in a hierarchy of elements
908
                              │
                              ▼
Storing the tree structure, including a level of each of the
elements and the relationship operation
910
```

```
┌─────────────────────────────────────────────┐
│ Determining whether updates have been       │
│ applied to one or more parsed reports       │
│ 1102                                        │
└─────────────────────────────────────────────┘
                      │
                      ▼
┌─────────────────────────────────────────────┐
│ If updates have been applied to the parsed  │
│ reports, cancelling a current operation and │
│ removing formulas and adjustment values     │
│ to return to an original value              │
│ 1104                                        │
└─────────────────────────────────────────────┘
                      │
                      ▼
┌─────────────────────────────────────────────┐
│ Identifying one or more fields to update    │
│ 1106                                        │
└─────────────────────────────────────────────┘
                      │
                      ▼
┌─────────────────────────────────────────────┐
│ Processing adjustments based on a given     │
│ hierarchy                                   │
│ 1108                                        │
└─────────────────────────────────────────────┘
                      │
                      ▼
┌─────────────────────────────────────────────┐
│ Concatenating the formulas, the original    │
│ value and the adjustment values inside the  │
│ fields in order to minimize an impact on a  │
│ layout of the report to allow reverse       │
│ operation and additional adjustments        │
│ 1110                                        │
└─────────────────────────────────────────────┘
```

FIG. 11

AUTOMATED ANALYSIS OF DATA REPORTS TO DETERMINE DATA STRUCTURE AND TO PERFORM AUTOMATED DATA PROCESSING

TECHNICAL FIELD

This description relates to systems and techniques for automated analysis of data reports to determine an underlying data structure of the reports and to perform automated data processing.

BACKGROUND

It may be challenging to automate the analysis and the processing of data that have been extracted from various documents and combined into one or more data reports. The structure of the underlying documents and the data reports might change, raw data are mixed with elements of the presentation layer of the data reports, and the labels are often not accurate enough to precisely identify the piece of information being disclosed. Users may need to manually prepare documents by mapping named ranges or adding unique identifiers, or building a hierarchy of elements including levels and weights. Those manual adaptations might significantly slow down the data processing workflow and cause errors.

For instance, people responsible for the design of companies' annual reports may not have direct access to the source information systems containing the underlying data. Moreover, the data structure might have been updated for publishing and might not be apparent from the raw numbers populating the report. It is a manually intensive process to review the report for data consistency and to remove data inconsistencies such as rounding errors from the financial-type documents.

SUMMARY

According to one general aspect, a computer-implemented method for building a hierarchy of elements depending on data disclosed in reports includes identifying one or more areas containing one or more elements in each of multiple reports which contain data, where the elements comprise parent elements and child elements. The method includes parsing the data of each of the elements to simulate relationship operations between the parent elements and the child elements until consistent aggregations are found, identifying data with a same unit and adjusting the data to have a same scale or a same precision, recursively searching the aggregated data by applying the found relationship operations to build a tree structure having at least a portion of the elements of each report built in the tree structure arranged in a hierarchy of elements and storing the tree structure, including a level of each of the elements and the relationship operation.

Implementations may include one or more of the following features. For example, parsing the data may include parsing the data of each of the elements to simulate relationship operations between the parent elements and the child elements until consistent aggregations are found including factoring a tolerance value against errors between the parent elements and the child elements when finding consistent aggregations. The tolerance value may be configurable. The tree structure may include an identifier generated for each element.

The method may further include identifying duplicate data and applying the same identifier for an identified duplicate. The method may further include translating a layout of the reports including an indentation of labels of each element, group outlines, special fonts on aggregated data into level attributes in the tree structure. Storing the tree structure may include storing the tree structure in a report such that the tree structure is hidden from view. The method may further include performing rounding adjustments using the tree structure. The method may further include performing one or more consistency checks using the tree structure.

In another general aspect, a computer-implemented method for collecting raw data from reports includes, for each of multiple reports, identifying areas of each report in rows and columns which contain data, detecting headers in the reported data and translating the headers into data attributes or dimension members, searching for duplicated identifiers between the reported data and creating foreign links between tables, searching for aggregations between the records and creating persistent hierarchies, building a data structure including the tables, the relations between the tables and the table hierarchies identified in the reports and storing the reported data with the database structure.

Implementations may include one or more of the following features. For example, the storage may be a multi-dimensional array of data. The storage may be a relational database. The data structure may include a tree structure. The tree structure may include an identifier generated for each element of the data structure. The method may further include applying a same identifier for an identified duplicate.

In another general aspect, a computer-implemented method for automating an update of tables or documents using identifiable formulas that display an original value, an adjustment value and special pattern strings used for transformations of computations includes determining whether updates have been applied to one or more parsed reports, if updates have been applied to the parsed reports, cancelling a current operation and removing formulas and adjustment values to return to an original value, identifying one or more fields to update, processing adjustments based on a given hierarchy and concatenating the formulas, the original value and the adjustment values inside the fields in order to minimize an impact on a layout of the report to allow reverse operation and additional adjustments.

Implementations may include one or more of the following features. For example, the update process may include the management of comments or labels attached to areas or cells of the reports for simulating updates, tracking updates, or logging information. The formula may be made of a user defined function including parameters such as the original value and the adjustment values. The formulas may include variables that can be updated through entry fields or graphical controls in the report or in the graphical user interface. The variables may be used for defining the scale and the number of digits of data in the report.

The general aspects and implementations described above may be implemented in a system such as a computer system and/or may be implemented in a non-transitory computer-readable storage medium. The details of one or more implementations are set forth in the accompanying drawings and the description below. Other features will be apparent from the description and drawings, and from the claims.

BRIEF DESCRIPTION OF THE DRAWINGS

FIG. 2 illustrates an example raw financial report without any formatting.

FIG. 3 illustrates the hierarchy of elements detected by the system 100 of FIG. 1 from the raw financial report of FIG. 2.

FIG. 4 illustrates an example multi-dimensional report without any formatting.

FIG. 5 illustrates the hierarchy of members detected by the system 100 of FIG. 1 from the sample multi-dimensional report of FIG. 4.

FIGS. 6A and 6B illustrate two tables with duplicated data detected by the system 100 of FIG. 1.

FIG. 9 is an example flowchart illustrating example operations of the system of FIG. 1.

FIG. 11 is an example flowchart illustrating example operations of the system of FIG. 1.

DETAILED DESCRIPTION

This document describes systems and techniques to analyze reports and automatically, without manual intervention, determine the structure of the data being disclosed, so that consistency checks or transformations can further be performed. When files or reports are exchanged or published, the consumer or the reader usually has no knowledge of the underlying data structure. Only the layout and the format of elements can provide hints to find out the metadata, if no database or dictionary is provided. This documents describes systems and technique that rebuild the data structure by combining together the numbers or the strings contained in reports, thus exposing the logic behind the figures. For instance, the system can rebuild a rollup hierarchy of table elements, identify keys between tables or list all dimensions in a cube.

One technical advantage achieved by the described systems and techniques is the ability to control the quality of reports and to reduce the time needed to process data such as performing rounding adjustments, simulations, comparisons, statistics, etc. Additionally, another technical advantage is that the described systems allow the extraction of raw data from reports and web pages.

One technical effect of an automated approach to determining the underlying structure of the raw data gleaned from one or more reports is to enable controls and adjustments to be applied to the data in a meaningful manner after the underlying structure has been automatically determined. If the structure and the hierarchy is not known from the raw data, then it is technically challenging and time consuming to attempt to make meaningful adjustments and controls to the data. One technical advantage is to be able to determine the underlying structure of the data, where individual portions of the data may have originated from many different sources for population as raw data into a report without underlying structure (e.g., no formulas or other indicia indicating relationships between the data) in the report itself. A technical solution is provided to determine the underlying structure and, once determined, use the underlying structure to perform automated processing, including adjustments and controls, to the data. The processing enables automated identification of inconsistencies and errors with the data.

Figure 1:
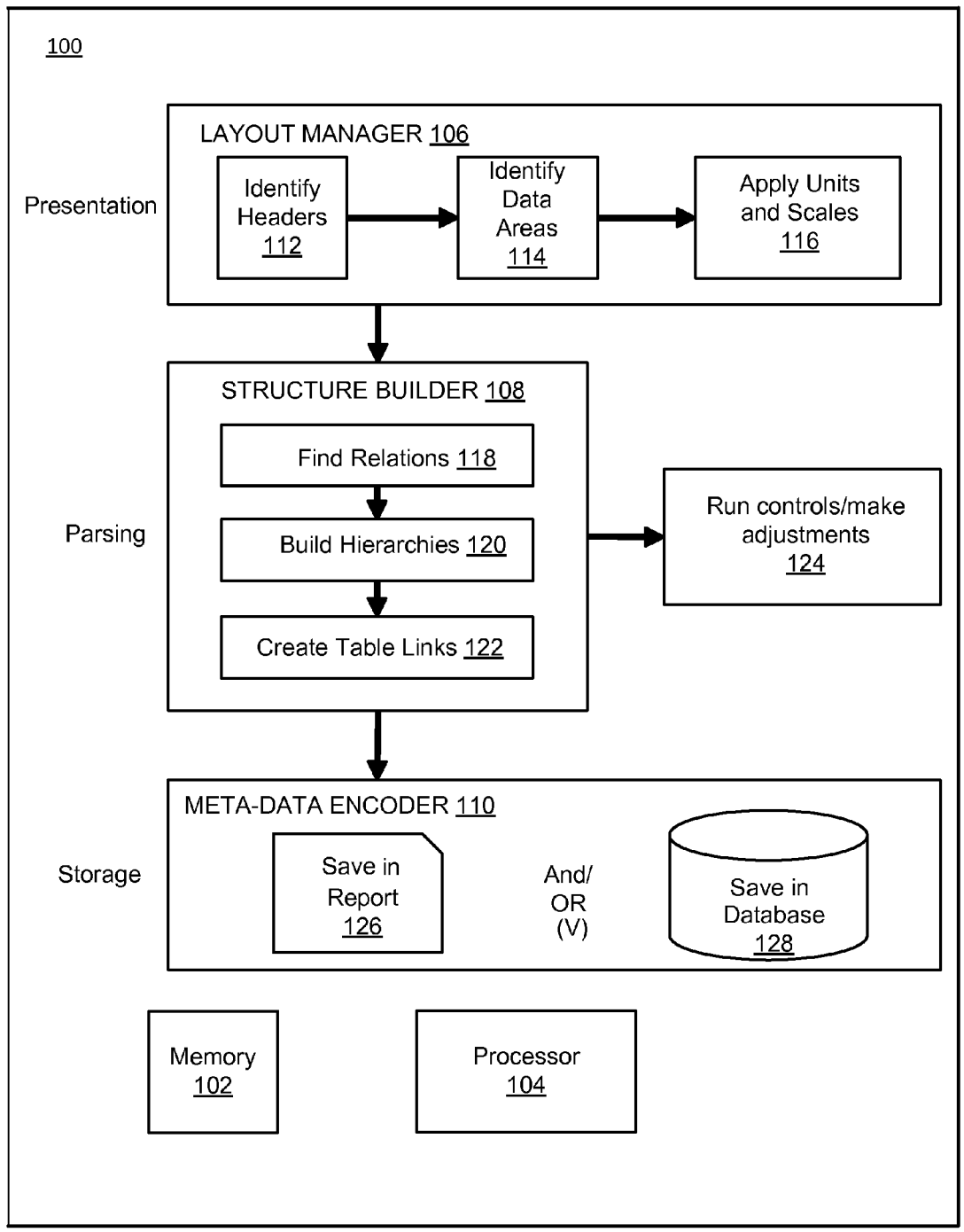
FIG. 1 is a block diagram of a system for an automated analysis of data reports to determine a data structure and to perform automated data processing.

FIG. 1 is a block diagram of a system 100 for an automated analysis of data reports to determine a data structure and to perform automated data processing. The components of system 100 may be implemented on a computing device. The computing device may include a server, a desktop, a laptop, a tablet, a notebook, a smartphone or any other type of computing device. The computing device may be connected to a network (not shown) and configured to communicate data across the network to other computing devices. The system 100 may be part of a larger enterprise system (not shown) such as, for instance, an enterprise management system.

The system 100 may include at least one memory 102 including instructions and at least one processor 104 that is operably coupled to the memory 102 and that is arranged and configured to execute the instructions stored on the memory 102. The instructions, when executed, cause the processor 104 to implement a layout manager 106, a structure builder 108 and a meta-data encoder 110. The system 100 may receive one or more reports containing data for processing by the layout manager 106, the structure builder 108 and the meta-data encoder 110. The reports received by the system 100 may include data only without supporting underlying structure evident from the report itself. That is, the reports contain the data only and not any underlying formulas or underlying arithmetic or logical relations between the data. Instead, the system 100 and its implemented components of the layout manager 106, the structure builder 108 and the meta-data encoder 110 work in combination to parse the reports and determine the underlying structure and relationship between the data. Examples of received reports are discussed in more detail below.

The system 100 combines together the numbers and narratives contained in the received reports to find out the data structure and the semantic. As discussed in detail below, the system 100 is configured to determine the hierarchy of the elements contained in tables of the reports. The hierarchy of the elements in the tables may include structured or unstructured parent-child relationships between the elements and may include nested dimensions. The system 100 also is configured to determine the relationships between tables, the different fields of a record or attributes of an object, the core and the calculated fields and the semantic of data found in documents.

In general, the layout manager 106 is configured to parse the presentation layer of a received report including identifying headers 112, identifying data areas 114 and applying units and scales 116 to the identified headers and data areas. The layout manager 106 parses reports to identify data areas 114 where the data is disclosed and communicates the identified data areas to the structure builder 108. The layout manager 106 also may identify the labels' semantic and the layout of the report including indentation of the rows, indentation of the columns, fonts and size of the fonts and change in fonts.

The structure builder 108 is configured to use the identified data areas to find relations 118 between the data. For example, the structure builder 108 may evaluate arithmetic and/or logical relations between data by using combinatory and/or inference algorithms until the structure builder 108 finds one or more possible rules that may apply to the data. The structure builder 108 attempts to apply the found rules and build the hierarchies 120 to build the data structure. Additionally, the structure builder 108 may use the identified labels' semantic and the layout of the report to build the hierarchies 120 to build the data structure. These features may be used separately or in conjunction combinatory and/or inference algorithms to determine the relations between data.

The structure builder 108 is configured to create table links 122 between the tables of data as part of determining the underlying structure of the data in the reports. Further, the structure builder 108 is configured for customization for accuracy so end-users can define a tolerance threshold, rounding settings and performing other operations with the data. The customization enables an end-user to set particular tolerances and other settings so that the system 100 can perform automated data analysis in accordance with the end-user customization settings. Of course, the structure builder 108 may include default tolerances and settings that the end-user may choose whether or not to customize.

Once the structure builder 108 determines the underlying structure including the fields and tables, as well as creating table links 122, the structure builder 108 runs controls and makes adjustments 124. Running controls and making adjustments 124 may include performing automated operations on the data including rounding and applying tolerances using the settings and tolerances set and/or accepted by the end-user. The automated operations include database normalization to eliminate and/or reduce data redundancies. The automated operations include searching for and finding duplicates in documents and web pages, comparing the found duplicates to one another to determine similar semantic description and then creating a local index to reference the data.

As mentioned above, the structure builder 108 is configured to find relations 118 between the data using the identified headers 112 and the identified data areas 114 as determined by the layout manager 114. For example, in the case where the parent nodes' values are the sum of the child nodes' values, it is possible for the structure builder 108 to deduce the hierarchy of the elements "backward" from the numbers disclosed in a report. In this example, the structure builder 108 first determines whether the aggregated elements are placed above or below their child elements. Then, the structure builder 108 parses the elements from lower to upper levels. The structure builder 108 analyses the elements starting from the bottom of the table if the aggregated values are above the child values, or from the top of the table when the aggregated values are below. The structure builder 108 may perform this determination and analysis recursively. By following a recursive processing, the structure builder 108 can identify all aggregated levels up to the root nodes. The structure builder 108 supports the combination of different operations (sums, subtractions . . . ) for aggregating elements.

In some instances, the calculated value from the child nodes is not exactly equal to the value of the aggregated element as reported in the table. That mismatch may be caused by rounded numbers. In this case, the structure builder 108 may apply the tolerance threshold under which the calculated value is considered equal to the aggregated value. In other instances, there are also cases where a small value is lower than the tolerance threshold or is equal to zero. In those instances, it might be difficult to assign that value inside or outside the node currently processed. The structure builder 108 is configured to run a special routine to evaluate the different possibilities.

When parsing reports including inconsistent or imprecise input values, the structure builder 108 is able to detect either multiple possible hierarchies or return no solution. The occurrence of several columns (or rows) of values increases the chance to find the proper hierarchy. Provided that the user's customization is correct, most actual reports enable to find out the original structure by applying the analysis method described above.

When the hierarchy spreads over one or multiple reports, there are additional cases to consider. For example, one element may appear several times related to the same set of dimensions. Logically, the reported number should be equal to its duplicates or slightly different due to rounding. In another example, one element may appear several times but related to different dimensions. Duplicate elements are hardly detectable in that case, and then it might be helpful to check the label of the headers or other piece of information in the report in order to identify the value and avoid creating duplicate entries. In these examples, the result is that the structure builder 108 applies the same determined hierarchy for one report or one view or one sheet for better accuracy.

The structure builder 108 can detect aggregates based on a number of different factors or variables. For example, the structure builder 108 can detect aggregates based on an unindented hierarchy of dimension members, defined by a parent-child relation between elements, for instance, a chart of accounts. Also, the structure builder 108 can detect aggregates based on a hierarchy of dimension members based on an attribute, for instance a geographical dimension composed of countries aggregated by regions. Further, the structure builder 108 can detect aggregates based on the juxtaposition of dimensions in one report axis, for instance the breakdown of sales by product and market in rows. The structure builder 108 can detect aggregates based on any other hierarchy, provided that the grouped data are consistent. Aggregates may be present in more than one dimension, for instance in rows and columns. The structure builder 108 will detect the hierarchy in both axes, check consistency and possibly make rounding adjustments so the aggregated values are correct in rows and columns.

In one implementation, the structure found during the analysis of the reports can be stored in a star or a snowflake schema composed of one fact table linked with dimension and reference tables. All labels are compared with semantic models, dictionaries or taxonomies to build a database or dimensional cube. The analysis of the report includes the tracking of redundant values in order to avoid that the same element is recorded several times in the structure. If a value is not null and similar to one already parsed, the structure builder 108 compares the header names corresponding to that value with tuples of dimension members already found. In case of a duplicate, no new dimension member is created and a new link is stored in the hierarchy of elements.

If the value is an identifier in text or numerical format, then the structure builder 108 checks whether it is the reference to an element already parsed, i.e. a foreign key, then it may create a relation between one or several tables 122.

Once a hierarchy is detected by the structure builder 108, the structure builder 108 passes the information to the meta-data encoder 110 and the meta-data encoder 110 stores the weight and possibly the hierarchy level for each element in hidden cells. The hierarchy can alternatively be materialized by the automated indentation of the labels. The structure builder 108 is able to detect that the table has already been parsed at least once. The meta-data encoder 110 may store the information in the report itself 126 and/or store the information in a database 128.

The structure builder 108 may build spreadsheet formulas in order to control consistency between child and aggregated elements. The structure builder 108 may apply automated conditional formatting to allow the highlighting of errors.

As referenced above, the structure builder 108 can then perform rounding adjustments in the case where data are generally consistent. In some implementations, the users' settings for the rounding process may include applying one of either rounding methods: symmetric round half-up or round half-even (also called the Banker's Rounding). The rounding process may include minimizing the absolute value cumulated in the adjustments, or minimize the impact of the adjustment for each figure (i.e. by updating the bigger value) or select the last or "other" figures. The rounding process may include performing bottom-up or top-down parsing and enabling distribution of the adjustments in more than one figure.

In one implementation, the system 100 may be implemented as part of an in-memory data system. Additionally and/or alternatively, the computation is made with in-memory data system, and the adjustments should not require additional table or cells so the solution is as much transparent as possible for the users. In one implementation, the adjustments may be stored separately from the original value in order to undo all changes and come back to the original values. In one example, the solution is to store the adjustments inside spreadsheet formulas of the report in the form of (original_value+rounding_adjustment).

As the rounding adjustments depend on the scale applied and the number of decimal digits, the full formula should be of the form: ROUND (original_value/scale; number_of_digits)+rounding_adjustment. In the menu of the application, drop boxes such as Scale and Digits allow to interactively parameter the global variables in the rounding formula.

For each adjusted cell, a comment can be added in order to display some audit trail information (adjustment value, applied scale . . . ). Further, the system 100 is open to manual updates, so the users can add control or adjustment data 124 before or after the program execution as part of the structure builder 108.

As mentioned, it is possible to reverse all actions of the structure builder 108 by the automated clean-up of the hierarchy, weight values, consistency controls and rounding adjustments. The system 100 integrates text parsing capabilities to remove from each cell the formulas added by the structure builder 108.

FIG. 2 illustrates an example raw financial report or table 200 without any formatting. The report 200 is a sample input report, which may be the result of a database query, or a financial statement pushed from a backend system, or a csv file transferred through the network, or the table of a web page. As the table 200 does not contain any piece of information related to the hierarchy of the elements listed in rows 202, the users usually have to manually complete the report by rebuilding the tree of elements. As discussed above, that is a time consuming task, before being able to perform consistency controls, rounding adjustments and other data processing.

Now, the system 100, as described above, will take the benefit of the consistency relations between the amounts (or values) 204 in order to deduce the hierarchy of positions. The system 100 is able to filter unnecessary layout components (like a blank column 206) in order to parse significant values only.

FIG. 3 illustrates the hierarchy of elements detected by the system 100 of FIG. 1 from the raw financial report of FIG. 2. In this manner, the table 300 represents the output of the sample report 200 shown in FIG. 2 after it has been processed by the system 100 of FIG. 1. All the elements expanded in rows are now properly structured based on the original hierarchy, i.e. the chart of accounts 302. The system 100 has automatically detected the structure of the row axis by combining together the numbers 304 disclosed in the report until it finds a rather consistent hierarchical tree. If several solutions are possible, the system 100 parses another set of values from a different column of the table or optionally displays all the resulted reports in different sheets.

In order to find the proper hierarchy, the system 100 evaluates all the possible operations at each level of the tree, which in this case is the addition and the subtraction operations, until it finds the approximate aggregated value, i.e. the solution of the equation: child_value(1)+/−child_value(2)+/− . . . +/−child_value(n)=aggregated value+/−the tolerance threshold set by the users. A child value can be the aggregated value of a lower level or a leaf value. In the sample report 300, the Treasury Shares position 306 must be subtracted from the sibling values in order to give the Total My Company, Inc. Shareholders' Equity aggregated position. The system 100 supports aggregated values located either above or below their child values in the report.

FIG. 4 illustrates an example multi-dimensional report or table 400 without any formatting. As shown in FIG. 4, the system 100 can process hierarchies in both vertical and horizontal axes. The sample input table 400 shows two aggregated dimensions Country and Product in rows and one dimension Time in columns including an aggregated Year To Date member. The table 400 may be the result of a cube query, a financial statement built with a Business Intelligence (BI) tool, a csv file transferred through the network.

As the table 400 does not contain any information related to the hierarchy of the elements listed in rows 402 and in columns 404, the users usually have to manually complete the report by rebuilding the tree of elements. As discussed above, that is a time consuming task, before consistency controls, rounding adjustments and other processing can be performed. In addition, chances to find rounding inconsistencies are higher in two-dimensional tables than with one-dimensional tables.

FIG. 5 illustrates the hierarchy of members detected by the system 100 of FIG. 1 from the sample multi-dimensional report 400 of FIG. 4. FIG. 5 illustrates the output of the sample report 500 shown in FIG. 4 after it has been processed by the system 100 of FIG. 1. In this example, the report 500 indicates the structure of a cube has been detected.

All the members from both the Country 502 and the Product dimensions 504 are now expanded and properly indented in rows. The hierarchy of the members from the Period dimension 506 is now properly rendered in columns. The system 100 can automatically detect the structure of the row and the column axes by combining together the numbers 508 or facts disclosed in the report until it finds rather consistent aggregates 510. A few of them are aggregates 512 both in row and in column.

If several structured hierarchies are possible for one axis, the system 100 can evaluate another set of values in the table, or try to match calculated values in rows and columns or optionally display all the resulted reports in different sheets. In order to find the proper multidimensional view, the system 100 evaluates all the possible operations at each level, which here are the addition, the average, the standard deviation, the count operations, until the temporary result is approximately equal to the above or below node plus or minus the tolerance threshold set by the users. In the sample report 500, consistency checks can then be performed on the row 514 axis, which is the combination of the Country and the Product dimensions, and on the column axis 516, which is the parent-child hierarchy of the Period dimension for the year 2014. In addition to the processing of the facts' values, the system 100 can have text recognition capabilities to analyze the 518 headers in rows and columns of the table 500.

Figure 6B:
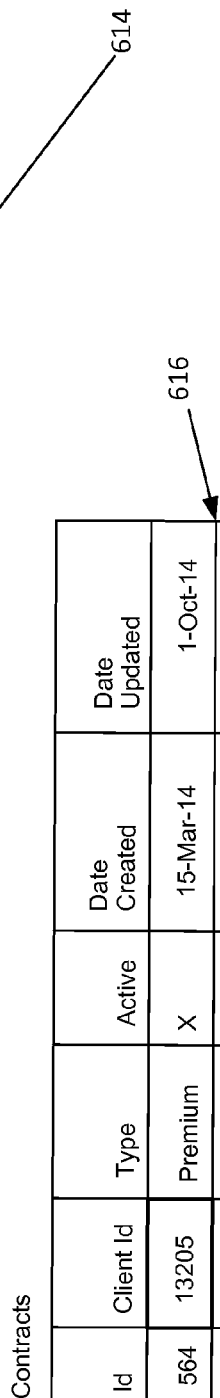

FIGS. 6A and 6B illustrate two tables with duplicated data detected by the system 100 of FIG. 1. FIG. 6A illustrates a sample case of duplicated data between two tables 602 and 604. While parsing reports to find out the hierarchy structure, the system 100 stores in a temporary collection or a database table 606 all values 608 found in the tables and the identified dimension members 610.

If a new value in the tables is equal to one already stored in the temporary collection (plus or minus the tolerance threshold) and the dimension members are similar, then it is marked as duplicated 612. The structure of the temporary table may vary to include internal identifiers so multiple occurrence of the same fact can be stored and refer to the same key. The cleaning of duplicates enables the figures to be tagged later. Referring to FIG. 6B, the system 100 is also able to distinguish foreign keys on one-dimensional tables 614 and 616 identified by a name. In that case, several records would contain duplicate values 618 between the same columns of different tables.

Figure 7:
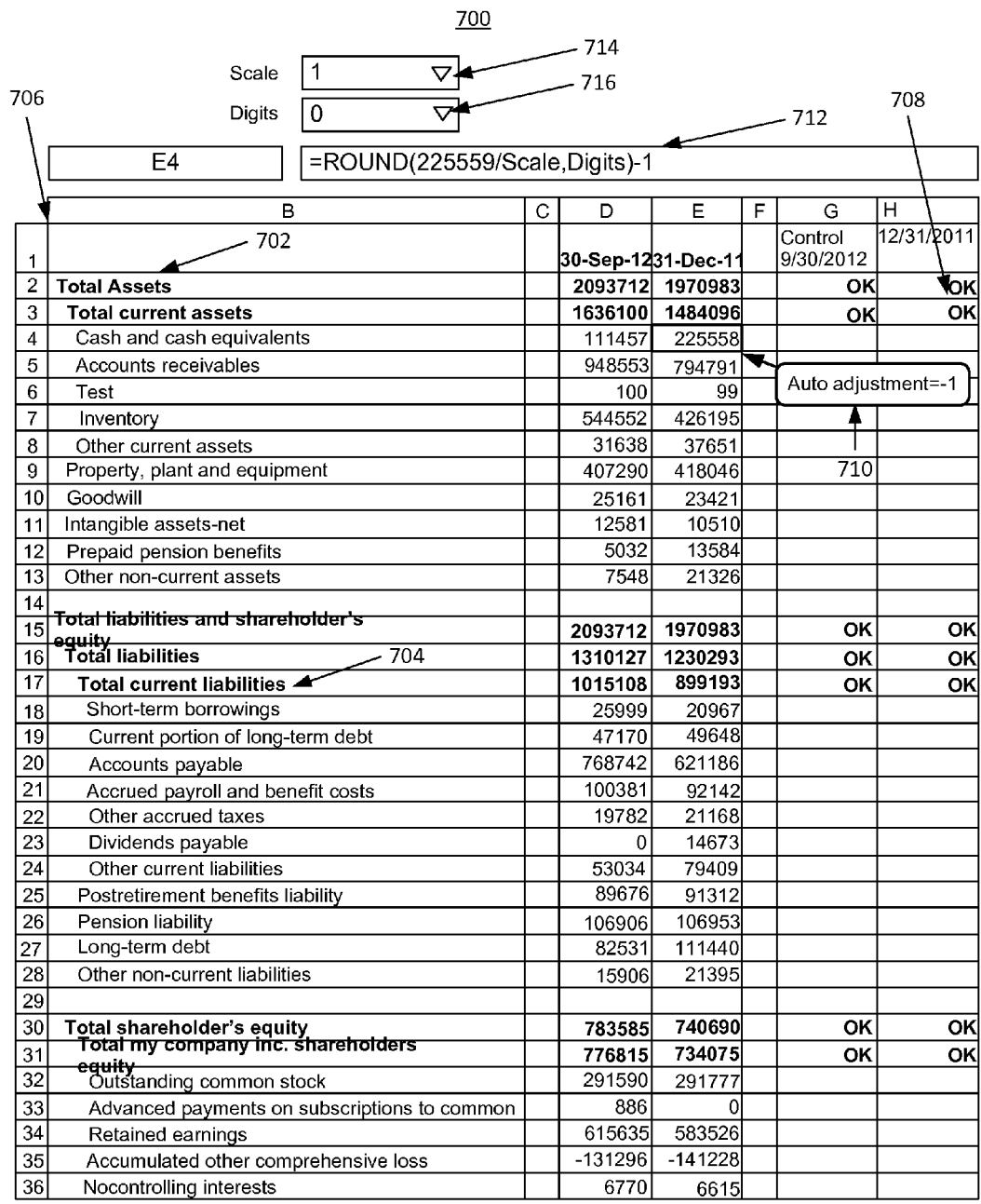
FIG. 7 illustrates an example application of data processing after applying the intelligence of the numbers technic.

FIG. 7 illustrates an example application of data processing after applying the intelligence of the numbers technique. In FIG. 7, a sample output report 700 is displayed after the update by the system 100. The hierarchy found is materialized by the indentation of the labels in the B column 702. The indent level enables to easily get the hierarchy level of the row (value+1). All aggregated rows 704 are put in bold font by the system for better readability.

In this example, the weight value found is stored in the hidden A column 706, it is typically equal to either 1 or −1. Then, the system 100 writes the control formulas 708. The resulted value is "OK" if the corresponding aggregated value is consistent with the sum of its child elements. If the value is equal to a number, it is the difference between the calculated and the aggregated value reported in the table.

Then, the user can launch automated resolution of the rounding errors if they are less than the customized threshold. The system 100 may apply different algorithms and parameters for rounding adjustments and specifically identify the values to update. All values changed by the system are marked by a comment 710 including at least the rounding adjustment applied on the cell. Each adjustment is stored in a cell's formula 712 combining the original value, the scale and the number of digits applied for the rounding. Thus, the worksheet is not polluted with additional cells or tables and the impact of the rounding adjustments is minimal on the layout. It is possible to undo adjustments or come back to the original value by applying regular expressions and removing chunks of a few characters from the string. The graphical user interface includes a Scale combo box 714 and a Digits combo box 716 in order to apply changes of scale or number of digits on all the cells of the workbook in real time.

Figure 8:
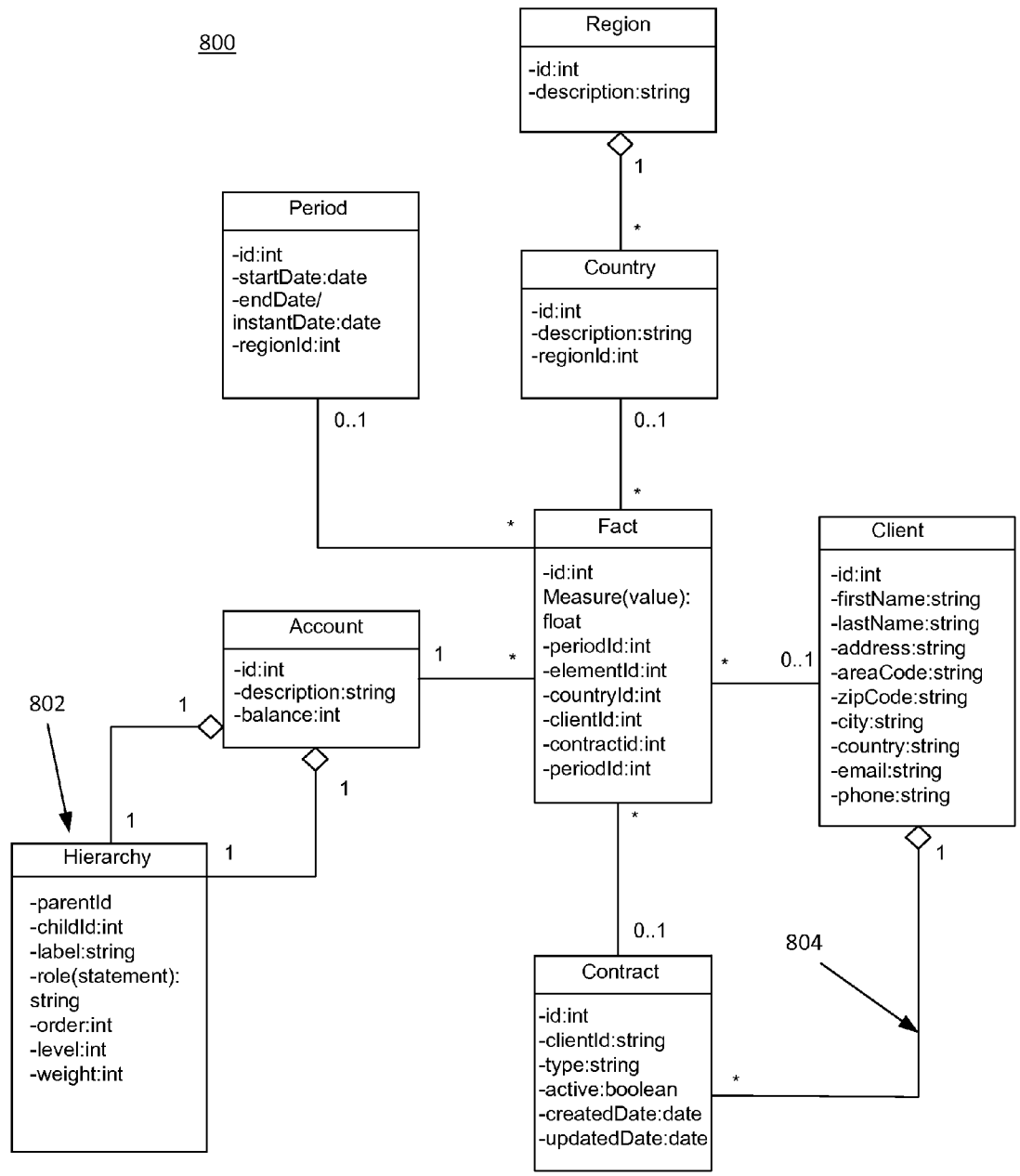
FIG. 8 illustrates an example logical data model built by the system 100 of FIG. 1.

FIG. 8 illustrates an example logical data model built by the system 100 of FIG. 1. As shown in the diagram class 800 of FIG. 8, the system 100 can finally produce a data model from the parsing of the reports in order to streamline further data processing. In this example, the structure is a mix of snowflake schema around a fact table and relational database. The Hierarchy table 802 keeps track of all parent-child relations and helps identify duplicate elements. The relation 804 between the Client and the Contract tables is created after identifying a foreign key between two columns.

FIG. 9 is an example flowchart illustrating example operations of the system 100 of FIG. 1. FIG. 9 illustrates a computer-implemented process 900 for building a hierarchy of elements depending on data disclosed in reports using the system 100 of FIG. 1. The process 900 includes identifying one or more areas containing one or more elements in each of multiple reports which contain data, where the elements comprise parent elements and child elements (902). The process 900 includes parsing the data of each of the elements to simulate relationship operations between the parent elements and the child elements until consistent aggregations are found (904), identifying data with a same unit and adjusting the data to have a same scale or a same precision (906), recursively searching the aggregated data by applying the found relationship operations to build a tree structure having at least a portion of the elements of each report built in the tree structure arranged in a hierarchy of elements (908) and storing the tree structure, including a level of each of the elements and the relationship operation (910).

Figure 10:
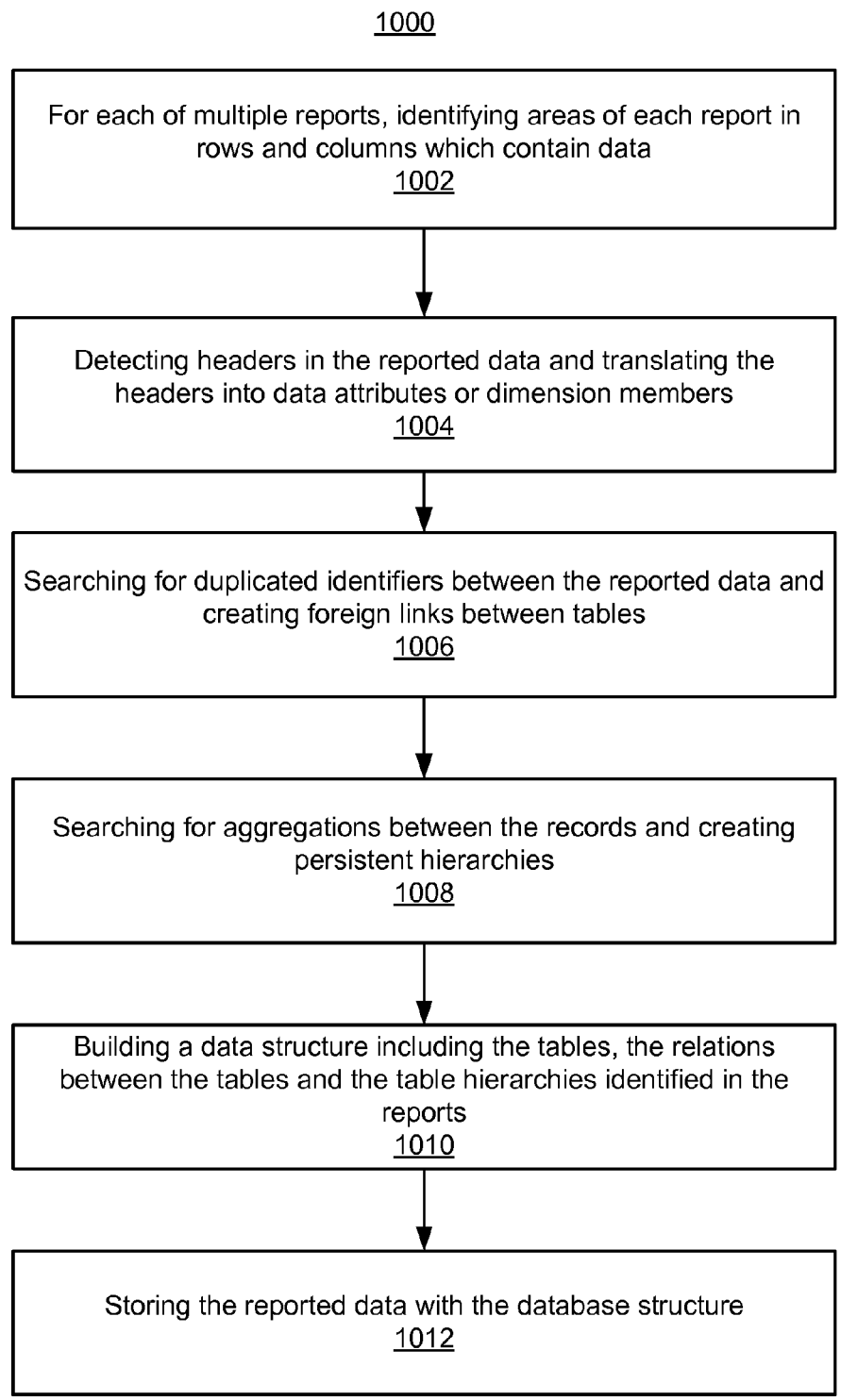
FIG. 10 is an example flowchart illustrating example operations of the system of FIG. 1.

FIG. 10 is an example flowchart illustrating example operations of the system of FIG. 1. FIG. 10 illustrates a computer-implemented process 1000 for collecting raw data from reports using the system 100 of FIG. 1. Process 1000 includes for each of multiple reports, identifying areas of each report in rows and columns which contain data (1002), detecting headers in the reported data and translating the headers into data attributes or dimension members (1004), searching for duplicated identifiers between the reported data and creating foreign links between tables (1006), searching for aggregations between the records and creating persistent hierarchies (1008), building a data structure including the tables, the relations between the tables and the table hierarchies identified in the reports (1010) and storing the reported data with the database structure (1012).

FIG. 11 is an example flowchart illustrating example operations of the system of FIG. 1. FIG. 11 illustrates a computer-implemented process 1100 for automating an update of tables or documents using identified formulas that display an original value, an adjustment value and special pattern strings used for transformations of computations using the system 100 of FIG. 1. Process 1100 includes determining whether updates have been applied to one or more parsed reports (1102), if updates have been applied to the parsed reports, cancelling a current operation and removing formulas and adjustment values to return to an original value (1104), identifying one or more fields to update (1106), processing adjustments based on a given hierarchy (1108) and concatenating the formulas, the original value and the adjustment values inside the fields in order to minimize an impact on a layout of the report to allow reverse operation and additional adjustments (1110).

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for building a hierarchy of elements depending on data disclosed in reports including executing instructions stored on a non-transitory computer-readable storage medium, the method comprising:

identifying one or more areas containing one or more elements in each of multiple reports which contain data, wherein the elements comprise parent elements and child elements;

parsing the data of each of the elements to simulate relationship operations between the parent elements and the child elements until consistent aggregations are found;

identifying data with a same unit and adjusting the data to have a same scale or a same precision;

recursively searching the aggregated data by applying the found relationship operations to build a tree structure having at least a portion of the elements of each report built in the tree structure arranged in a hierarchy of elements to enable automated identification of inconsistencies and errors in the data, wherein the tree structure includes an identifier generated for each element;

identifying duplicate data and applying a same identifier for an identified duplicate; and storing the tree structure, including a level of each of the elements and the relationship operation.

2. The method of claim 1, wherein parsing the data includes parsing the data of each of the elements to simulate relationship operations between the parent elements and the child elements until consistent aggregations are found includes factoring a tolerance value against errors between the parent elements and the child elements when finding consistent aggregations.

3. The method of claim 2, wherein the tolerance value is configurable.

4. The method of claim 1, further comprising translating a layout of the reports including an indentation of labels of each element, group outlines, special fonts on aggregated data into level attributes in the tree structure.

5. The method of claim 1, wherein storing the tree structure comprises storing the tree structure in a report such that the tree structure is hidden from view.

6. The method of claim 1, further comprising performing rounding adjustments using the tree structure.

7. The method of claim 1, further comprising performing one or more consistency checks using the tree structure.

8. A computer program product for building a hierarchy of elements depending on data disclosed in reports, the computer program product being tangibly embodied on a non-transitory computer-readable storage medium and comprising instructions that, when executed by at least one computing device, are configured to cause the at least one computing device to:

identify one or more areas containing one or more elements in each of multiple reports which contain data, wherein the elements comprise parent elements and child elements;

parse the data of each of the elements to simulate relationship operations between the parent elements and the child elements until consistent aggregations are found;

identify data with a same unit and adjusting the data to have a same scale or a same precision;

recursively search the aggregated data by applying the found relationship operations to build a tree structure having at least a portion of the elements of each report built in the tree structure arranged in a hierarchy of elements to enable automated identification of inconsistencies and errors in the data;

translate a layout of the reports including an indentation of labels of each element, group outlines, special fonts on aggregated data into level attributes in the tree structure; and store the tree structure, including a level of each of the elements and the relationship operation.

9. The computer program product of claim 8, wherein the instructions that, when executed by the at least one computing device, are configured to cause the at least one computing device to parse the data include instructions that, when executed by the at least one computing device, are configured to cause the at least one computing device to parse the data of each of the elements to simulate relationship operations between the parent elements and the child elements until consistent aggregations are found includes factoring a tolerance value against errors between the parent elements and the child elements when finding consistent aggregations.

10. The computer program product of claim 9, wherein the tolerance value is configurable.

11. The computer program product of claim 8, wherein the tree structure includes an identifier generated for each element.

12. The computer program product of claim 11, further comprising instructions that, when executed by the at least one computing device, are configured to cause the at least one computing device to identify duplicate data and apply a same identifier for an identified duplicate.

13. The computer program product of claim 8, wherein the instructions that, when executed by the at least one computing device, are configured to cause the at least one computing device to store the tree structure comprises instructions that, when executed by the at least one computing device, are configured to cause the at least one computing device to store the tree structure in a report such that the tree structure is hidden from view.

14. The computer program product of claim 8, further comprising instructions that, when executed by the at least one computing device, are configured to cause the at least one computing device to perform rounding adjustments using the tree structure.

15. The computer program product of claim 8, further comprising instructions that, when executed by the at least one computing device, are configured to cause the at least one computing device to perform one or more consistency checks using the tree structure.

16. A computer-implemented method for building a hierarchy of elements depending on data disclosed in reports including executing instructions stored on a non-transitory computer-readable storage medium, the method comprising:

identifying one or more areas containing one or more elements in each of multiple reports which contain data, wherein the elements comprise parent elements and child elements;

parsing the data of each of the elements to simulate relationship operations between the parent elements and the child elements until consistent aggregations are found including factoring a tolerance value against errors between the parent elements and the child elements when finding consistent aggregations;

identifying data with a same unit and adjusting the data to have a same scale or a same precision;

recursively searching the aggregated data by applying the found relationship operations to build a tree structure having at least a portion of the elements of each report built in the tree structure arranged in a hierarchy of elements to enable automated identification of inconsistencies and errors in the data; and storing the tree structure, including a level of each of the elements and the relationship operation.

17. The method of claim 16, wherein the tolerance value is configurable.

18. The method of claim 16, wherein storing the tree structure comprises storing the tree structure in a report such that the tree structure is hidden from view.

19. The method of claim 16, further comprising performing rounding adjustments using the tree structure.

20. The method of claim 16, further comprising performing one or more consistency checks using the tree structure.

* * * * *